(12) United States Patent
Visbal

(10) Patent No.: US 9,560,066 B2
(45) Date of Patent: *Jan. 31, 2017

(54) SYSTEM AND METHOD FOR EVALUATING NETWORK THREATS AND USAGE

(71) Applicant: Palantir Technologies Inc., Palo Alto, CA (US)

(72) Inventor: Alexander Visbal, New York, NY (US)

(73) Assignee: PALANTIR TECHNOLOGIES INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/816,748

(22) Filed: Aug. 3, 2015

(65) Prior Publication Data

US 2016/0028759 A1 Jan. 28, 2016

Related U.S. Application Data

(63) Continuation of application No. 14/479,863, filed on Sep. 8, 2014, now Pat. No. 9,100,428, which is a continuation of application No. 14/147,402, filed on Jan. 3, 2014, now Pat. No. 8,832,832.

(51) Int. Cl.
*G06F 21/00* (2013.01)
*H04L 29/06* (2006.01)

(52) U.S. Cl.
CPC ....... *H04L 63/1433* (2013.01); *H04L 63/0209* (2013.01); *H04L 63/0272* (2013.01); *H04L 63/101* (2013.01); *H04L 63/14* (2013.01); *H04L 63/1408* (2013.01); *H04L 63/1416* (2013.01); *H04L 63/1425* (2013.01); *H04L 63/1441* (2013.01); *H04L 63/0236* (2013.01); *H04L 63/145* (2013.01)

(58) Field of Classification Search
CPC ............ H04L 63/1433; H04L 63/1425; H04L 63/101; H04L 63/1416; H04L 63/0209; H04L 63/0272; H04L 63/1408; H04L 63/14; H04L 63/1441; H04L 63/145; H04L 63/0236

See application file for complete search history.

(56) References Cited

U.S. PATENT DOCUMENTS

| | | | |
|---|---|---|---|
| 2006/0212931 A1* | 9/2006 | Shull | G06F 21/55 726/10 |
| 2012/0079592 A1* | 3/2012 | Pandrangi | H04L 47/10 726/22 |
| 2015/0128274 A1* | 5/2015 | Giokas | H04L 63/1425 726/23 |

* cited by examiner

*Primary Examiner* — Kendall Dolly
(74) *Attorney, Agent, or Firm* — Knobbe, Martens, Olson & Bear, LLP

(57) ABSTRACT

Systems and methods are presented for generating a threat score and a usage score of each of a plurality of IP addresses. The threat score may be determined based on quantity of occurrences and recency of each occurrence of an IP address in network alert datasets, in addition to a weighting factor for each data source indicating the accuracy of the data source.

20 Claims, 9 Drawing Sheets

SYSTEM AND METHOD FOR EVALUATING NETWORK THREATS AND USAGE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of Ser. No. 14/479,863, filed Sep. 8, 2014, which is a continuation of U.S. patent application Ser. No. 14/147,402 filed Jan. 3, 2014, now U.S. Pat. No. 8,832,832. Each of these applications are hereby incorporated by reference herein in their entireties.

TECHNICAL FIELD

The present disclosure relates to systems and techniques for generating scores representing the threat reputation and usage of respective IP addresses.

BACKGROUND

Traditional IP address blacklists and whitelists have to be updated periodically and contain many false positives. Traditional methods of classifying an IP address as a threat can mistakenly classify IP addresses of employees and authorized users as threats.

SUMMARY

There is a need to generate threat reputation scores and usage scores of IP addresses based on reliability of data sources, passage of time, membership in various data sources, and/or amount of threats or uses. There is also a need to understand both the network threat potential and possible trusted affiliation of an IP address at the same time.

In accordance with one aspect, a computer system comprises one or more computer processors and a tangible storage device storing one or more modules configured for execution by the one or more computer processors in order to cause the computer system to: determine an IP address for which a threat score is to be determined; access data sources from each of one or more data sources, the data sources comprising: a plurality of recorded network threat events, date and time of each of the plurality of recorded network threat events, an originating IP address for each of the plurality of recorded network threat events, and/or an event type of each of the plurality of recorded network threat events; determine which of the data sources includes one or more occurrences of the IP address, wherein each occurrence indicates a threat by the IP address; for each of the data sources for which the IP address is a member of the corresponding data source: determine a quantity of occurrences of the IP address in the data source; determine a recency of each occurrence of the IP address in the data source, wherein recency is determined based on an amount of time between respective occurrences and a current time; determine a weighting factor for each of the data sources indicating expected accuracy of respective occurrences indicated in the data source of the data source; and determine the threat score for the IP address based at least on the determined quantity of occurrences, the recency of occurrences, and the weighting factor for each of the data sources.

In accordance with another aspect, one or more computer processors and a tangible storage device storing one or more modules configured for execution by the one or more computer processors in order to cause the computer system to: determine an IP address for which a usage score is to be determined; access network usage datasets from each of one or more data sources, the network usage datasets comprising: a plurality of recorded network usage events, date and time of each of the plurality of recorded network usage events, an originating IP address for each of the plurality of recorded network usage events, and/or an event type of each of the plurality of recorded network usage events; determine which of the network usage datasets includes one or more occurrences of the IP address, wherein each occurrence indicates a usage by the IP address; for each of the data sources for which the IP address is a member of the corresponding network usage dataset: determine a quantity of occurrences of the IP address in the data source; determine a recency of each occurrence of the IP address in the network usage dataset, wherein recency is determined based on an amount of time between date and time of respective occurrences and a current time; determine a weighting factor for each of the data sources indicating authority of each of the data sources; and determine an usage score for the IP address based at least on the determined quantity of occurrences, the recency of occurrences, and the weighting factor for each of the data sources.

In accordance with another aspect, a non-transitory computer-readable storage medium storing computer-executable instructions configured to direct a computing system to: determine an IP address for which a threat score is to be determined; access data sources from each of one or more data sources, the data sources comprising: a plurality of recorded network threat events, date and time of each of the plurality of recorded network threat events, an originating IP address for each of the plurality of recorded network threat events, and/or an event type of each of the plurality of recorded network threat events; determine which of the data sources includes one or more occurrences of the IP address, wherein each occurrence indicates a threat by the IP address; for each of the data sources for which the IP address is a member of the corresponding data source: determine a quantity of occurrences of the IP address in the data source; determine a recency of each occurrence of the IP address in the data source, wherein recency is determined based on an amount of time between respective occurrences and a current time; determine a weighting factor for each of the data sources indicating expected accuracy of respective occurrences indicated in the data source of the data source; and determine the threat score for the IP address based at least on the determined quantity of occurrences, the recency of occurrences, and the weighting factor for each of the data sources.

DETAILED DESCRIPTION OF CERTAIN EMBODIMENTS

Definitions

Figure 1:
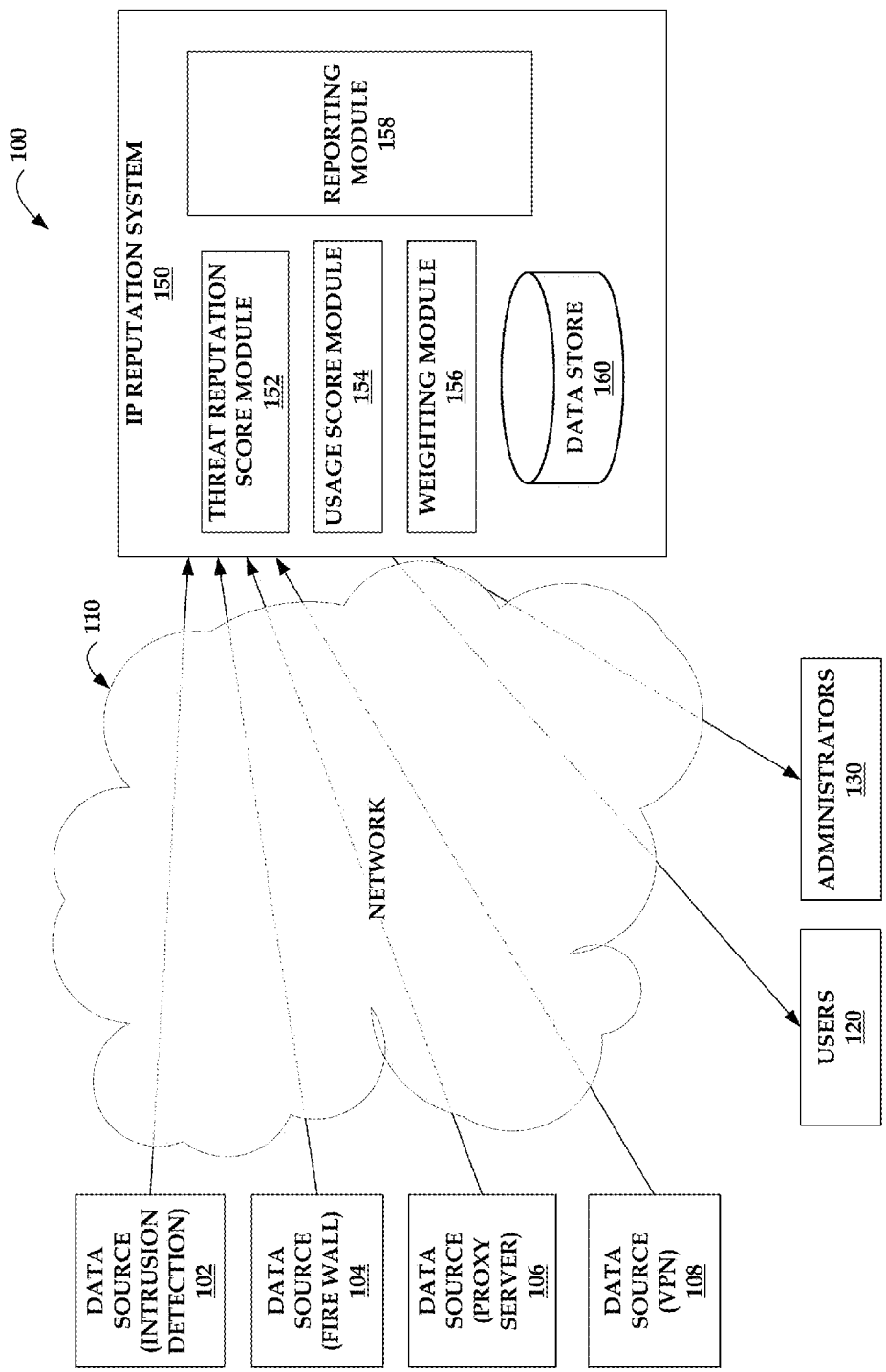
FIG. 1 illustrates one embodiment of an IP reputation system, various data sources, modules, and data flow in the system.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others. It is also called a data store or a data structure herein.

Data Object or Object: A data container for information representing specific things in the world that have a number of definable properties. For example, a data object can represent an entity such as a person, a place, an organization, a market instrument, or other noun. A data object can represent an event that happens at a point in time or for a certain duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., person, event, or document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Threat Reputation Score (Threat Score): A score that represents the maliciousness of an IP address. It can be a probability of an IP address being involved in an actual network security threat based on historical network security data. The score may also be called an "threat score," and/or a "risk score."

Usage Score: A score that represent a likelihood that an IP address is trusted and, therefore, is not involved in threat activities associated with an entity. For example, a usage score may indicate how actively an IP address is used by a trusted user, such as a customer, an employee, or an authorized user of an entity, as opposed to untrusted and/or unauthorized users of the entity's computing network. It is also called "customer and employee usage score."

IP Reputation System

FIG. 1 illustrates one embodiment of an IP reputation system, various data sources, modules, and data flow in the system. The system 100 includes multiple data sources, including data sources 102, 104, 106, 108, which represented different example data source types. In particular, data source 102 represents an intrusion detection system, which may include a device or application that monitors network or system activities for malicious activities or policy violations, and reports such activities to a management device or system. Data source 104 represents a firewall, which may include a device-based or application-based network security system that controls incoming and/or outgoing network traffic by analyzing data packets and determining whether the traffic should be allowed through or not, based on an applied rule set. Data source 106 represents a proxy server, which may include a computing system or an application that acts as an intermediary for requests from clients seeking resources from other computing resources. Data source 106 may include a web proxy, a database proxy, reverse proxy, and so forth. Data source 108 represents a Virtual Private Network (VPN), which may enable a computing device to send and receive data across shared or public networks as if the computing device were directly connected to the private network.

Other types of data sources, such as mobile computing devices, game servers, and so forth, may also provide input data regarding network security events. For example, a mobile device may act as a hotspot for other devices. The hotspot application installed on the mobile device may maintain a log of potential threats and also users, accounts, and/or devices that are authorized to use the hotspot. Other types of data sources not explicitly mentioned may also be used.

Data sources such as depicted in FIG. 1 may maintain logs of network traffic, including IP addresses of various computing devices that are connected to and/or request resources from the data sources. For example, a VPN usually is associated with a VPN log. The VPN log allows administrators, users, and network security analysts to determine the IP address, entities, locations, and so forth, of the computing devices that have been connected to the VPN. Similarly, a firewall log reveals a lot of information about security threat attempts at a network and also the nature of the traffic coming in and going out of the firewall. Logs from an intrusion detection system 102, a proxy server 106, and so forth usually also includes information regarding historic connection information of network traffic.

In some embodiments, some data sources, such as an intrusion detection system 102, may also maintain "black lists," which include IP addresses that the data sources deem dangerous. Some data sources publish and share such black lists periodically with the public. Some data sources maintain proprietary black lists shared only internally within an organization. Some software providers have black lists that may be included with purchase of proprietary network security software. There are also websites which allow users to check whether an IP address is included in one or many of such black lists maintained by various sources.

In some embodiments, some data sources, such as VPN 108, may include a database of trusted users, a trusted user table, or a list of authorized users or user computing devices. This may also be referred to as a "white list" or a "trusted list." For example, a VPN server may maintain one or more data tables of users who are authorized to log in to the VPN server and connect to a private network. Membership in a "white list" usually means that the user is a trusted user, an employee of an organization, or someone authorized to access a private network.

In some embodiments, various computing devices and/or users may be designated as safe so that communications with those safe computing devices are not erroneously designated as potentially dangerous. For example, in a company that tests SPAM email detection software, a testing computer that sends out SPAM emails on a regular basis may be marked as a safe computer and given access to various network resources.

The system 100 also includes a network 110, users 120 that are connected to the network 110, and administrators 130 who are connected to the network 110. The system 100 includes an IP reputation system 150, which is in communication with one or more of the data sources and provides IP reputation data to users, among other functions that are discussed herein.

Depending on the embodiment, the IP reputation system 150 may include a threat reputation score module 152, a usage score module 154, a weighting module 156, and a reporting module 158, discussed further below. The reputation system 150 may also include a data store 160. In some embodiments, the data store 160 may be located remotely from the IP reputation system 150. The IP reputation system 150 and its various modules may receive input data from data sources 102, 104, 106, 108, and other types of sources of network traffic and security data.

In general, the IP reputation system 150 accesses data at multiple data sources in order to assess characteristics of particular IP addresses. The weighting module 156 may generate weights for respective data sources based on historic accuracy of network threat reports. Depending on the embodiments, the more accurate a data source is in terms of successful past threat alerts, the more weight is assigned to incidents reported by that data source. Various methods for generating weights for respective data sources are further discussed below.

In some embodiments, the threat reputation module 152 may use network security information from the data sources 102, 104, 106, and 108 (including network threats, time, location, IP address, and so forth), weights generated by the weighting module 156, and/or additional information such as an IP address's membership in a "blacklist" or a "watch list" in a data source, to generate threat reputation scores for individual IP addresses and/or groups of IP addresses. Various methods for generating the threat reputation scores are further discussed below. Depending on the embodiment, network threats may include various suspicious, unwanted, and/or illegal activities. For example, network threats may include network attacks (e.g., denial of service attacks) and/or threats (e.g., activities that don't rise to the level of an attack, but are suspicious, unwanted, and/or illegal).

In some embodiments, the usage score module 154 may use network security information from data sources 102, 104, 106, and 108 (including network attacks, time, location, IP address, and so forth), weights generated by the weighting module 156, and/or additional information such as an IP address's membership in a trusted employee list or inclusion in a trusted user list in a data source, to generate usage scores for individual IP addresses and/or groups of IP addresses. Various methods for generating the usage scores are further discussed below.

Depending on the embodiment, the reporting module 158 may generate a user interface, a heat map, web site, or some other kinds of representation of the scores generated by the threat reputation score module 152 and/or the usage score module 154. The reporting module 158 may also send scores to the users 120 and/or administrators 130 directly in a summarized report, identifying potentially important IP addresses that the administrators 130 or the users 120 should pay special attention to. Further details regarding the reporting module 158 are discussed below.

Figure 2:
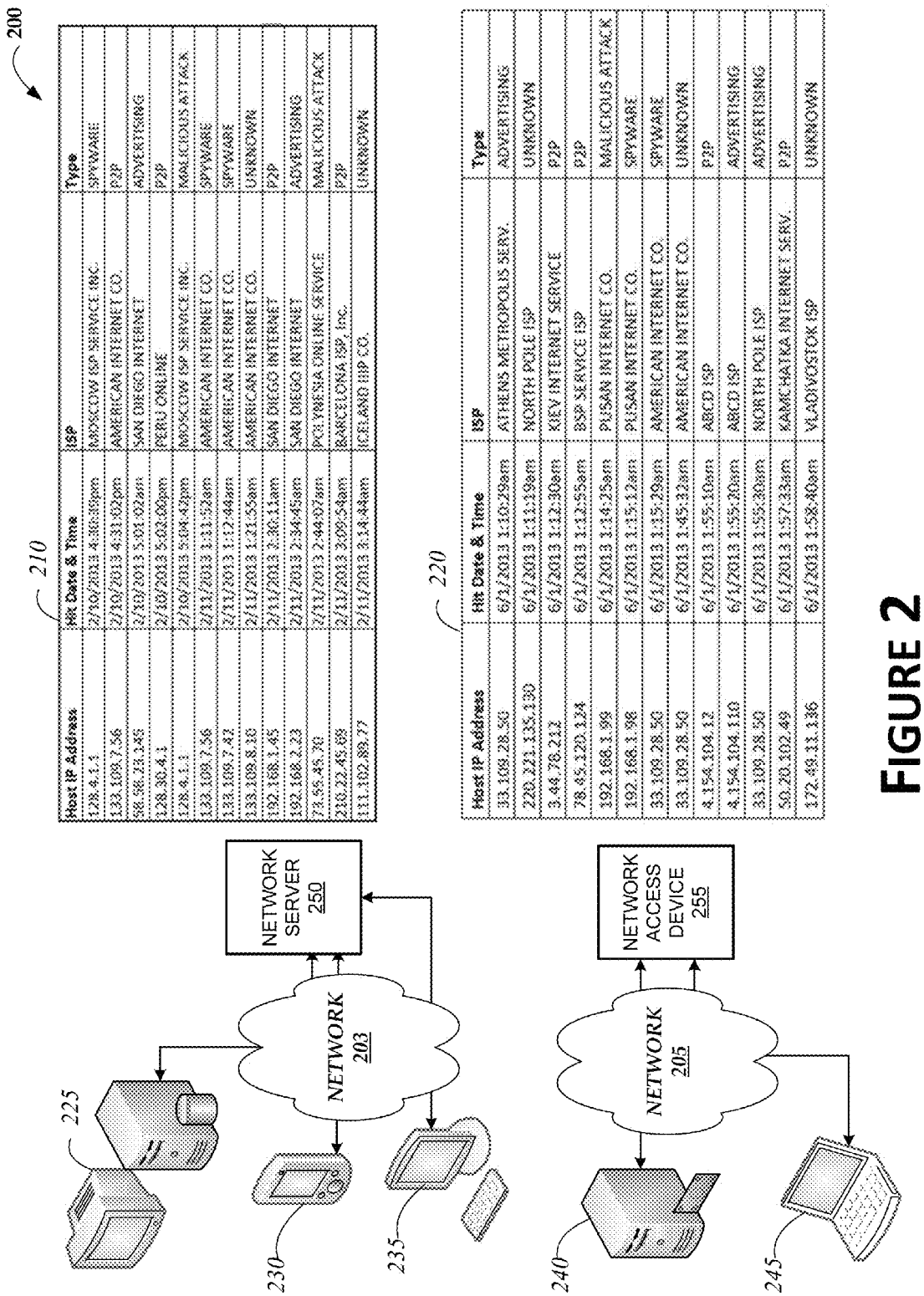
FIG. 2 illustrates an embodiment of system illustrating various data sources and information collected from the various data sources.

FIG. 2 illustrates two data sources 250 and 255, and information collected from those various data sources. As shown in FIG. 2, a server computer 225, a mobile phone/computing device 230, and a personal computer 235 are all connected to the network server 250 via network 203. The network server 250 may be an email server, web server, database server, print server, file server, authentication server, or a computing node acting as a peer-to-peer server (P2P server), and so forth. In this example, a computing node 240 and a laptop computer 245 are connected to the network access device 255 via network 205. The network access device 255 may be a router, switch, network bridge, and so forth.

In some embodiments, the network server 250 and network access device 255 each maintain a log of historic network security events that are believed to be potentially noteworthy. For example, the network server 250 may maintain a log of suspicious activities as shown in table 210. Depending on the embodiment, the log may include information such as host IP address, date and time of the hit (event), name of the Internet Service Provider (ISP) if known, and the type of event. In the example as shown in FIG. 2, the types of event include spyware, peer-to-peer (P2P), advertising, malicious attack, suspicious and/or illegal activities, and some unknown activities that could be potentially suspicious or dangerous. Depending on the embodiment, other types of threats or suspicious activities may also be included, such as sending SPAM emails, too many failed authentication requests, and so forth. Each activity, its originating IP address, date and time, and ISP information may also be included in the log. As shown in FIG. 2, the network access device 255 also maintains a log of suspicious activities as shown in table 220 in a format that is similar to table 210. Depending on the embodiment, the security events may be stored in any format and include additional and/or less information than is shown in the example tables 210 and 220.

Analyzing information stored in table 210 and table 220 can be difficult for several reasons. First, there can be many false alerts. For example, if a trusted user who has VPN or other types of access to the network server 250 has forgotten his or her password, and tried unsuccessfully to log onto the network server 250 frequently in a short period of time, this could be seen as a potential security threat and recorded in the log. A user or an administrator cannot easily tell that the IP address of the trusted user is not initiating an attack or an otherwise true alert-worthy activity. Second, a busy server of a network access device may receive a huge number of visit or resource requests per second. Therefore, the logs can be much longer than the tables 210 and 220. It is virtually impossible for humans to analyze such data. It is also slow and inefficient to spot false alerts using traditional programs that monitor such activities because traditional programs maintain a list of suspicious IP addresses or computing device identities.

Figure 3:
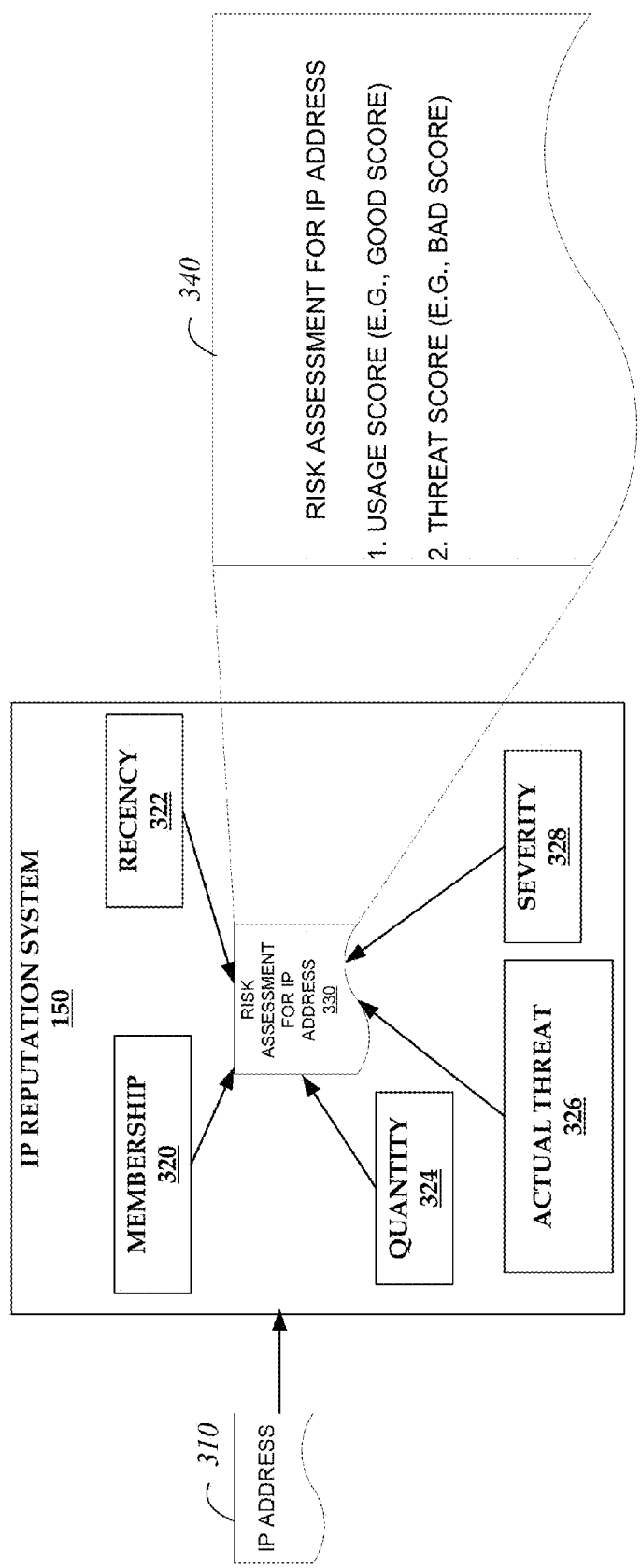
FIG. 3 illustrates an embodiment of the IP reputation system and factors considered by the system in generating threat reputation scores and usage scores.

FIG. 3 is conceptual block diagram illustrating example factors that may be considered by the system in generating threat reputation scores and usage scores, such as for a particular IP address 310. Depending on the embodiment, the IP reputation system 150 may consider data from various other data sources in determining attributes of an IP address.

As indicated in FIG. 3, membership 320 in public and/or private blacklists and trusted user lists (e.g., whitelists, such as authorized VPN users) may be considered in determining scores or other characteristics of the IP address 320.

The IP reputation system 150 may consider recency 322 of the suspicious events. Generally, the more recent a suspicious event is, the more probable that it is indicative of the risk potential of the IP address 310. Similarly, the more recent a trusted event (such as an authorized device logging into a VPN), the more probative it is regarding the trustworthiness of the IP address 310.

The IP reputation system 150 may also consider the quantity 324 of suspicious events or trusted events originating from the IP address 310. Generally, the more suspicious activities that an IP address 310 is involved in, the more likely that the IP address 310 may pose a security threat. Similarly, the more trusted events an IP address 310 is involved in, the more likely that the IP address 310 is an IP address that is used by an employee or an otherwise authorized/trusted user.

In addition, the IP reputation system 150 may also consider the severity 328 of suspicious events originating from the IP address 310. Depending on the embodiment, potentially suspicious events may be categorized according to various standards and/or conventions. For example, a malicious attack may more serious than advertising. However, the level of severity may also be adjusted or customized based on different organizational needs. For example, an organization may want to identify IP addresses that are associated with disseminating copyrighted materials online. Accordingly, the IP reputation system 150 may set the severity 328 of P2P events and potential sharing of large files higher than normal.

Moreover, severity 328 may also be affected by origin of the IP address. For example, if the IP address is from a known notorious source of hacking activities, then the severity used for calculating the threat reputation score may be higher than normal even for suspicious events of the same type.

The risk assessment 340 for the particular IP address may include both a usage score (also called a good score) and a threat reputation score (also called a threat score or a bad score). The risk assessment 340 may be provided to an entity in various formats, such as via one or more user interfaces that display usage scores, threat scores, and/or other information regarding particular IP addresses (e.g., see the example user interfaces of FIG. 4). The usage score may represent how trustworthy the IP address is. For example, if the usage score is based on the membership information 320, such as a list of trusted and/or authorized users and their device information, and the IP address 310 is associated with an employee's device (e.g., employee's cellphone) in the membership information 320, the usage score for the IP address 310 may be relatively high. In another example, if the IP address 310 has been involved in multiple actual threats based on quantity 324 and actual threat data 326, it is more likely that the IP address 310 may have a higher threat score. In some embodiments, the recency 322 and severity 328 also play important roles in determining the threat score.

Figure 4:
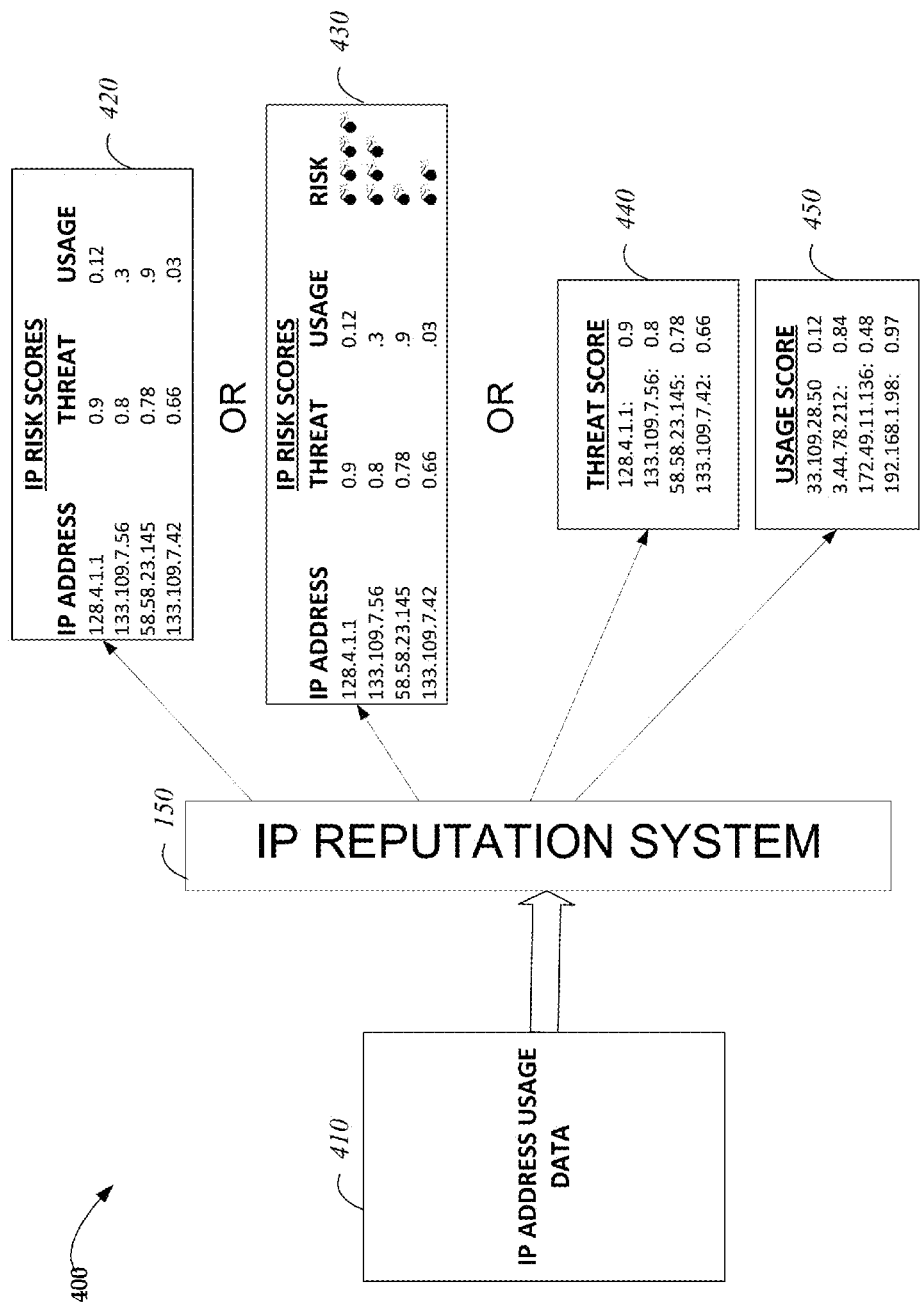
FIG. 4 illustrates three stages of generating threat reputation scores and usage scores using the IP reputation system.

FIG. 4 is a flow diagram illustrating various types of IP scoring/ratings that may be generated by the IP reputation system. The example embodiment 400 includes a list of IP addresses 410, which may also include additional information such as event type, time, originating location, settings, severity, type, and so forth, regarding respective IP addresses. During the first stage of generating the scores, the list of IP address 410 may be gathered from a variety of data sources. As discussed, the data sources may include all kinds of computing, networking, and/or mobile devices.

During the second stage of generating the scores as shown in FIG. 4, the IP reputation system 150 analyzes the IP address usage data 410, which may include various types of data, such as those illustrated in FIG. 3. In some embodiments, the IP address usage data 410 can include IP addresses, activities associated with the IP addresses, connection types, date, and time, and so forth. Because a given IP address may appear in multiple different threat data sources and each occurrence can be considered, in order to generate the scores of a given IP addresses, input data from across a plurality of data sources may be considered.

During the third stage of generating the scores, the IP reputation system 150 may generate and present scores, ratings, and/or other summary data related to the IP addresses, to various users. The scores may be presented to users in various formats via the reporting module 158. For example, a table 420 may be generated and presented to a user or an administrator. The table 420, as shown, includes four IP addresses and their respective pair of scores—a threat score and a usage score for each IP address. This format allows a user or an administrator to easily identify interesting targets for further investigation. For example, the IP address "58.58.23.145" has both a high threat reputation score (0.78) and a relatively high usage score (0.9). The high threat reputation score may be based largely on the fact that the IP address frequently appears in an intrusion detection system, while the high usage score may indicate that the IP address is used by someone with trusted access, such as an employee who regularly connects to the network with VPN. In this example, it may be unwise to simply blacklist this IP address and prohibit it from connecting in the future.

The table 430, as shown, includes additional example representations of risk levels. In this example, a "risk" representation has taken both the threat reputation score and the usage score into consideration already. For example, the IP address "58.58.23.145" has both a high threat reputation score (0.78) and a relatively high usage score (0.9). Therefore, in terms of risk, it is shown in table 430 as only having one "bomb" associated with it—less than the risk rating of two bombs given to IP address "133.109.7.42," which is associated with a lower usage score of 0.03, which may indicate that the moderate threat score of 0.66 is not mitigated by appropriate usage data associated with the IP address. Depending on the embodiment, other graphical indicators may be provided (e.g., rather than the bombs shown in example table 430), and various algorithms may be used in interpreting threat usage and/or usage scores in order to determine graphical representations.

Figure 5:
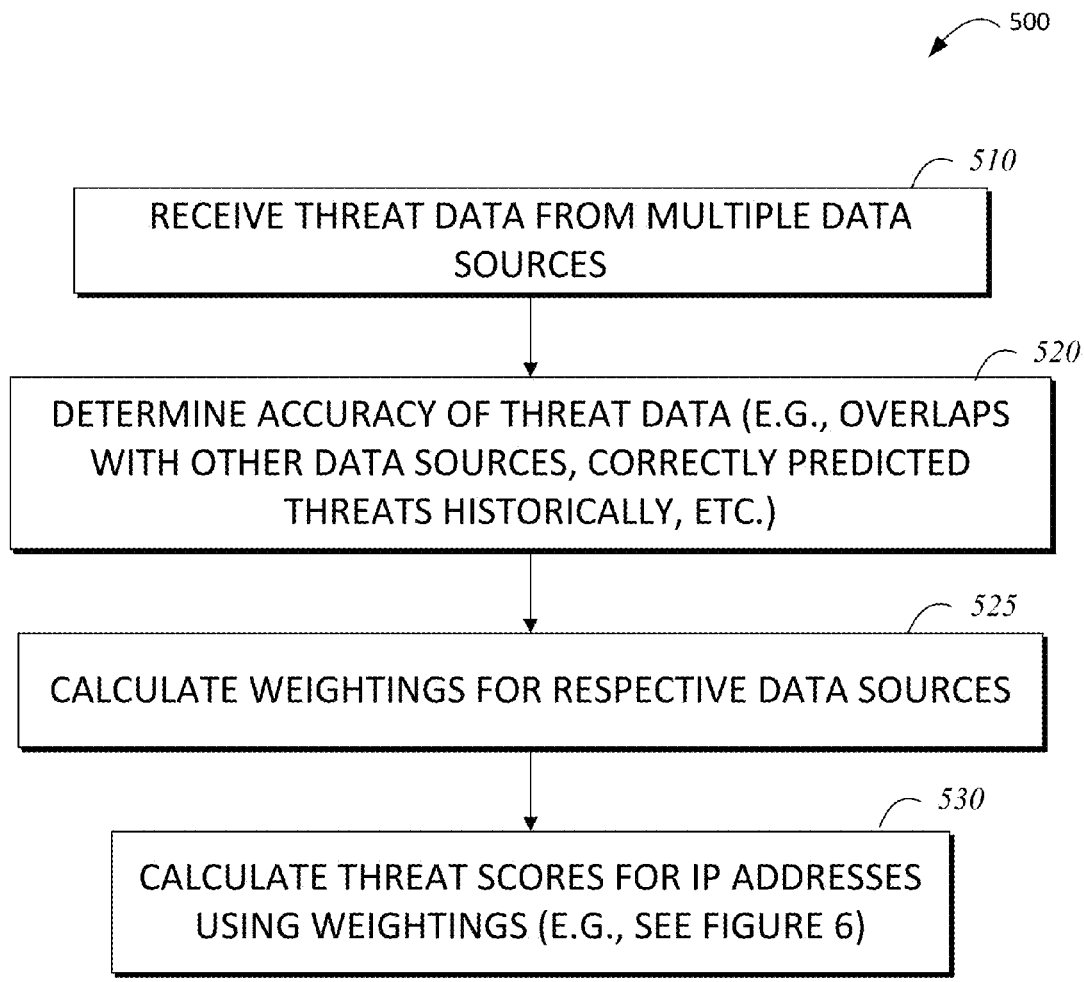
FIG. 5 is a flowchart depicting an illustrative process of determining weightings of data sources.

Depending on the embodiment, the IP reputation system 150 may also generate threat reputation scores and usage scores and list them in data structures, such as example tables 440 and 450, as shown in FIG. 4. A user or an administrator may sort the scores and identify the IP addresses that are most dangerous or trustworthy, or most likely a candidate for false alarms (e.g., a score with high threat score and high usage score, etc.). The usage and threat data in these data structures may then be analyzed in various manners in order to provide an end user with the best data for consumption of the data, whether it be a risk score table such as table 420 or a risk rating graphical indicator, such as in table 430, or in some other form, Example Threat Reputation Scoring Methods FIG. 5 is a flowchart depicting an illustrative process of determining weightings of data sources. The process of FIG. 5 may be performed by the IP reputation system 150 in response to input from one or more data sources, for example, such as a log from a VPN, an intrusion detection system, a computing device, a network device, a server, and so forth. However, the process may also be performed by other computing systems in some embodiments. Depending on the embodiment, the method of FIG. 5 may include fewer or additional blocks and the blocks may be performed in an order that is different than illustrated.

The process 500 begins at block 510, wherein threat related data is received from multiple data sources. As previously discussed, the IP reputation system 150 may calculate threat reputation scores using data from one or more data sources. One benefit of using data across a variety of data sources is that data sources have differing levels of data and accuracy levels of such data.

The process 500 then proceeds to block 520 and the accuracy of threat data from the one or more data sources are determined. In some embodiments, in order to determine accuracy of the various data sources, the IP reputation system 150 may compare data received from various data sources to identify overlaps. For example, if an intrusion detection system reports a suspicious activity from IP address 110.110.110.110 at 10:49 PM on Dec. 5, 2013, and a firewall installed on the same internal network also reports a suspicious activity from the same IP address 110.110.110.110 at 10:49 PM on Dec. 5, 2013, then it is more likely that both are accurate regarding this particular activity and IP address.

In some other embodiments, the IP reputation system 150 may compare the reported data from various data sources against known (e.g., confirmed) security threats. For example, the IP reputation system 150 may maintain a list of known security threats for a given period of time. The IP reputation system 150 may then identify the alerts as reported by various data sources relevant to the IPs in the known security threats during the same period of time. For example, a data source may provide threat data associated with a particular IP address on day 1, but that particular threat is not confirmed until day 10 (nine days after the data source originally indicated that there is a threat risk associated with the IP address, and before the threat could be confirmed). Because the data source accurately indicated a threat risk that turned into an actual threat, future data from that particular data source may be very valuable. Accordingly, the IP reputation system 150 may assign a high weighting to threat risk from that data source (or perhaps some subset of threat data from that data source, such as threat data of the same type that has been associated with later confirmed threats). Conversely, if a data source provides threat data that is never associated with an actual threat (e.g., within a predetermined time period after the threat data is received), the IP reputation system 150 may assign a lower weighting to that data source, or to sonic subset of threat data provided from that data source. Depending on the embodiment, weightings may be determined in real-time (e.g., each time a risk score for an IP address is requested), or in some scheduled manner, such as nightly based on new threat data received from various sources and confirmed threats that may be associated/linked to previously received threat data.

The process 500 then proceeds to block 525 wherein the IP reputation system 150 calculates weightings for respective data sources. In the calculation of threat reputation scores, the weights used for each data source may be represented as a value $c_i$. Depending on the embodiment, the weight for a data source may be an estimated percentage of its IP addresses that are involved in actual threats. Depending on the embodiment, the percentage may he calculated in different ways depending on the data sources. Moreover, the weights may be updated over time or as needed.

In addition, the method of how weights are calculated can be further designed to be configurable based on the type of data source. For example, for data sources that are or similar to an alerting systems (e.g., an Intrusion Detection System or IDS), there may be reported malicious IP addresses used in actual threats in the past (e.g., historical threats that are previously recorded). For known malicious IPs used in actual threats, the IP reputation system 150 may divide the number of alerts relevant to those IP addresses by the total number of alerts during the time frame of a given actual threat. This value serves as a rough "signal-to-noise" ratio that can be used as a weight. The ratio can be more accurate if more data regarding malicious IP addresses become available. Additionally, feedback from analysts who work with these alerting systems may also be considered.

For data sources such as external blacklists (e.g., Dell™ SecureWorks), the IP reputation system 150 may estimate the percentage of IP addresses that are involved in actual threats that it predicts will be involved in threats. In some embodiments, the percentage can be calculated by counting the number of IP addresses on each blacklist that appear in alerting system data sources (e.g., intrusion detection systems, SPAM in the ProofPoint enterprise email security system, etc.) during a given time interval after the blacklist was received. In some other embodiments, actual threat data, known actual attack data (such as recorded attack events that are verified) and experiment attack data (such as attacks that are initiated for purposes of analyzing a system and/or testing the alert responses) may also be used.

In some embodiments, blacklists containing IP addresses that appear in none of the accessible alerting system data sources may be given a low default weight so that they can be configured to appear in the IP address's reputation summary, but do not have a large impact on the score. This situation may occur if the blacklist was received from a source who reported IP addresses with an alerting mechanism different from any other alerting systems.

Another type of data source is internal blacklists. In some embodiments, the IP reputation system 150 may use all the IP addresses that appear in the internal blacklists and apply similar weighting methods as previously discussed regarding external blacklists to IP addresses originating from the internal blacklists. In some other embodiments, higher weights may be given to the internal blacklists because they can be considered to be more trustworthy.

The process 500 then proceeds to block 530 wherein the IP reputation system 150 calculates threat reputation scores for respective IP addresses. In some embodiments, the threat reputation score for an IP address may be calculated based on a probability of a given IP address being involved in an actual threat based on the historical accuracy of threat data sources that the IP address appears in. For example, each data source is associated with a weight, which can be an estimated percentage of its IP addresses that were actually involved in a threat. If an IP addresses is reported by multiple data sources, the probabilities may be combined to produce a final score.

Figure 6:
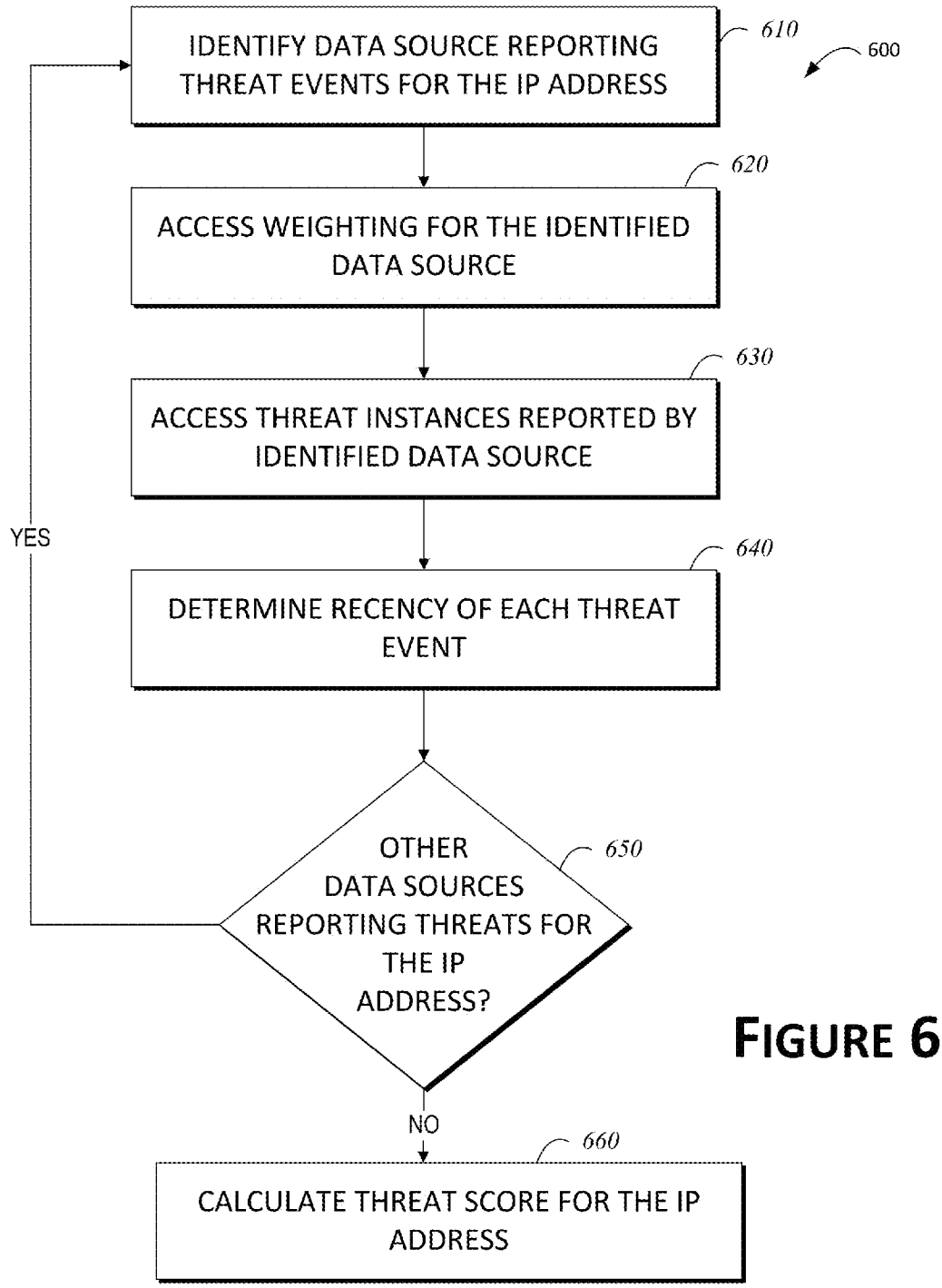
FIG. 6 is a flowchart depicting an illustrative process of calculating a threat reputation score for an IP address.

FIG. 6 is a flowchart depicting an illustrative process of calculating a threat reputation score for an IP address, such as at block 530 of FIG. 5. The process of FIG. 6 may be performed by the IP reputation system 150 in response to an inquiry regarding the potential threats related to an IP address. For example, an entity may transmit a request for a threat reputation score of an IP address that is requesting access to the entity's network, such as to gauge whether or not the IP address should be blocked from the network. In some embodiments, an entity may transmit a request for generating threat reputation scores for a plurality of IP addresses that may have attempted to or have accessed its network. The request may be processed by the IP reputation system 150 in batch.

The data sources used in the process 600 may include various sources such as a log from a VPN, an intrusion detection system, a computing device, a network device, a server, and so forth. However, the process may also be performed by other computing systems in some embodiments. Depending on the embodiment, the method of FIG. 6 may include fewer or additional blocks and the blocks may be performed in an order that is different than illustrated.

The process 600 includes several blocks that are performed for each of one or more data sources reporting and threat risk for a given IP address. In particular, blocks 610-640 may be performed for each data source.

Beginning at block 610, a data source reporting one or more risks of threat associated with the IP address is identified. The data sources may be one of an alert system, external blacklist, internal blacklist, sever log, device log, and so forth. The data sources that include risk data for the IP address may be used to calculate a weight for one or more of the data sources, such as is discussed above with reference to FIG. 5.

The process 600 then proceeds to block 620, wherein the IP reputation system 150 accesses a weighting for the identified data source. In some embodiments, this can be performed through a query to the data store 160. In one embodiment, the weighting for the data source may be calculated in real-time when needed (e.g., at block 620 of FIG. 6).

The process 600 then proceeds to block 630, wherein the IP reputation system 150 accesses threat risk instances reported by the identified data source regarding the particular IP address. For example, it may be determined that an intrusion detection system reports that the IP address 110.110.110.110 appears on its list 500 times.

The process 600 then proceeds to block 640, wherein the IP reputation system 150 determines recency of each threat event. For example, for each of the 500 times that the IP address 110.110.110.110 appears in the intrusion detection system's report, a timestamp may be associated with each occurrence. The IP reputation system may calculate the difference between the current time and the time as indicated in the timestamp. Various units, such as minutes, seconds, hours, days, months, and so forth, may be used to report the difference based on the user's needs.

The process 600 then proceeds to decision block 650, wherein the IF reputation system 150 determines whether there are other data sources reporting threat risks associated with the particular IP address being considered. If the answer to the question is yes, then the process 600 proceeds repeats blocks 610-640 for each additional data source reporting threat risks for this IP address.

If the answer at decision block 650 is no, then the process 600 proceeds to block 660, wherein the IP reputation system 150 calculates a threat score for the IP address. Risk scores may be calculated in many ways using many algorithms and inputs. One example scoring method/algorithm is discussed below. In this simplified example, the IP threat reputation system 150 receives input from data sources B1 and B2. Historically, 20% of the IP addresses that each of data sources B1 and B2 predicted as future threats were actually involved in actual past threat events. Knowing this, the IP reputation system 150 may assign a weight of 0.2 to each data source, meaning there is a 20% chance that an individual IP address on either of these lists will be involved in an actual threat event. For a new IP address being investigated that appears in both B1 and B2, there is a (1−0.2)×(1−0.2)=0.64 chance the IP address will not be a real threat. Accordingly, there is a 36% chance the IP would be a real threat. In one embodiment, the IP threat reputation score may be 36%, 0.36, or some other variant of this combined probability.

Other factors such as passage of time since the occurrence of an event may be considered in generating the threat reputation score for an IP address. In some embodiments, a decay function can be used to account for passage of time. In some embodiments, a decay factor between 0 and 1 can be assigned. If the event is less recent (for example, 2 years ago), it is considered less relevant than an event that is more recent. An example decay function can be a weighted exponential decay function. In some embodiments, the following exponential decay function may be used by the IP reputation system 150: $D_i(t):=e^{c(t-t_0)}$, wherein i is an indicator of a particular data source (e.g., i may vary from 1-500), $c_i$ is a weighting for a data source, t is the time associated with a threat event, $t_0$ is the current time, and C is a constant to limit the rate of decay. However, in other situations, other decay functions can also be used, such as a constant decay, step decay, linear decay, weibull decay, hill decay, smooth-compact decay function, and so forth.

In some embodiments, a threat reputation score may be calculated by the IP reputation system 150 as: $S_n:=1-\Pi_{i=1}^n(1-c_iD_i(t_i))$, wherein $S_n$ may represent the threat reputation score for an IP address considering all n occurrences of that IP address across the data sources considered by the IP reputation system 150, $c_i$ is the weight associated with each respective data source containing the ith occurrence of this IP address, $t_i$ is the time of the ith occurrence of the IP address—for example, the timestamp of an intrusion detection alert containing the IP address or the time a blacklist containing the IP address was incorporated in the IP reputation system, and $D_i(t)$ is the decay function for the data source, as discussed previously, to account for the passage of time for the ith occurrence containing this IP address.

In some other embodiments, the threat reputation score of an IP address may also be generated using a formula that is different from the one discussed above. For example, instead of exponential decay, the decay function may be configured as a constant decay (1), step decay (1 for t<L, otherwise 0), linear decay (1−t/L), weibull decay $$\left(e^{\left(-\left(\frac{t}{L}\right)^k \times \log(2)\right)}\right),$$

hill decay $$\left(\frac{1}{\left(1+\left(\frac{t}{L}\right)^{\wedge} k\right)}\right),$$

smooth-compact decay function $$\left(e^{\left(k-\frac{k}{(1-(\frac{t}{L})^{\wedge}2)}\right)}\right),$$

and so forth, wherein L is a rate of decay and k is a shape parameter. The constant value in each decay function may also be configured to differently depending on specific use cases.

Scoring methods that combine occurrences of IP addresses across many threat related data sources into a single weighted score may provide more valuable scores than a single source score. The above-noted approach gives each data source an independent, configurable weight suitable to the particular IP threat detection needs of a particular user or administrator. Additionally, multiple occurrences of an IP address in the same data source may also be considered, such that the more frequent an IP address appears, it is more likely that the threat reputation score is higher. Moreover, using this approach, older events in an IP address's history may contribute less than more recent events to the overall threat reputation score of an IP address.

Example Usage Scoring Methods

Figure 7:
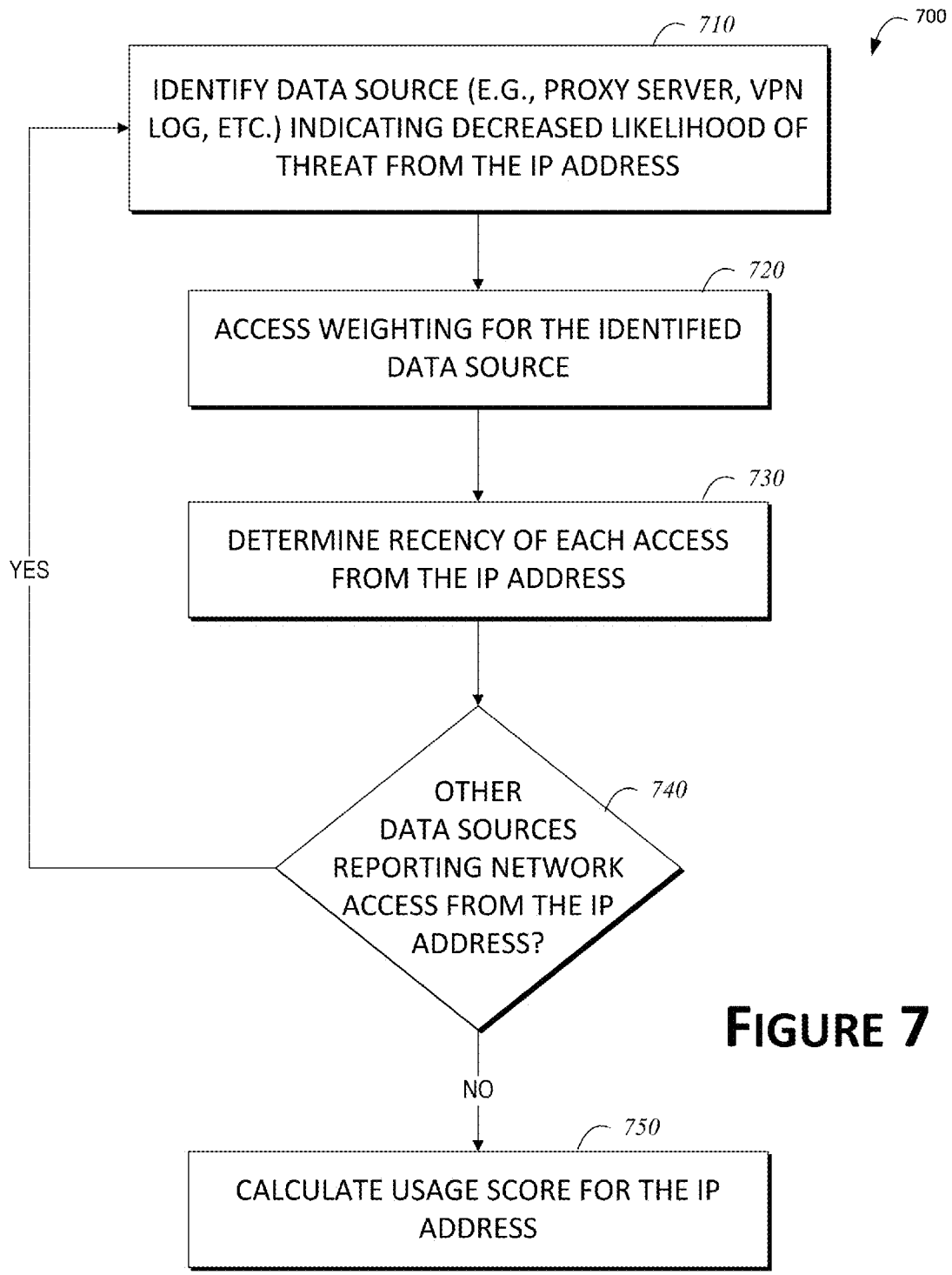
FIG. 7 is a flowchart depicting an illustrative process of calculating a usage score for an IP address.

FIG. 7 is a flowchart depicting an illustrative process of calculating a usage score for an IP address. A usage score provides an indication of a level of activities that are indicative of non-threatening activities associated with an IP address. For example, if an IP address appears in VPN logs, white lists, or weblogs hitting a post-login URL, it could be used by an employee, customer, or other trusted user. In addition, if proxy server data shows that many employees are regularly connecting to an IP address that appears on a black list, it may be a sign that it is a false positive (e.g., perhaps the IP address should not be on the blacklist). Therefore, generating a separate and independent score may be useful in determining an overall reputation for IP addresses.

The process of FIG. 7 may be performed by the IP reputation system 150 in response to input from one or more data sources, for example, such as a log from a VPN, an intrusion detection system, a computing device, a network device, a server, and so forth. However, the process may also be performed by other computing systems in some embodiments. Depending on the embodiment, the method of FIG. 7 may include fewer or additional blocks and the blocks may be performed in an order that is different than illustrated. FIG. 7 includes several blocks that are performed for each of one or more data sources reporting information that is indicative of reduced risk of an actual threat for a given IP address. In particular, blocks 710-740 may be performed for each data source.

The process 700 begins at block 710, wherein a data source reporting decreased likelihood of a threat associated with a particular IP address (or range of IP addresses in some embodiments) is identified. The data source may report network usage events, such as an authorized user logging on to a VPN network, a bank customer logging into his or her banking account, a customer of a business logging into a payment system, an authorized user establishing a connection to a proxy server, and so forth. The data sources may be one of a trusted device list, a VPN log, a secure FTP server log, an authorized user data store, and so on. In addition to receiving reports of network usage events, the process 700 may also use the received reports from the data source to calculate a weight for this data source (e.g., block 720), which may be used to represent how trustworthy the sources are, as discussed previously.

The process 700 then proceeds to block 720, and weighting for the identified data source is accessed. In some embodiments, this can be performed through a query to the data store 160. In some other embodiments, the weights may be accessed directly by the IP reputation system 150 as previously calculated weight data that has already been made available to the system. In one embodiment, the weighting for the data source may be calculated in real-time when needed (e.g., at block 720 of FIG. 7).

The process 700 then proceeds to block 730, and the recency of each network usage event in data from the identified data source is determined. For example, for each of the 500 times that the IP address 110.110.110.110 appears in a VPN log, a timestamp may be associated with each occurrence. The IP reputation system may calculate the difference between the current time and the time as indicated in the timestamp. Various units, such as minutes, seconds, hours, days, months, and so forth, may be used to report the difference based on the user's needs.

The process 700 then proceeds to decision block 740 wherein the IP reputation system 150 determines whether there are still other data sources reporting decreased risks associated with the particular IP address being considered. If the answer to the question in decision block 740 is no, then the process 600 proceeds to block 660 and calculates a usage score for the IP address. If there are additional sources, blocks 710-730 are repeated for each additional data source before proceeding to block 750.

Depending on the embodiment, the usage score can be determined by the sum of all customer, employee, or other trusted usage events whose contributions to the usage score are decayed over time. In some embodiments, a similar decay rate as previously discussed for the threat reputation scores may be used. A different decay rate function may also be configured as needed. In some embodiments, the usage score can be calculated as $S_{usage} := \Sigma_{i=1}^{n} k_i e^{c_i(t_i - t_0)}$, where $t_i$ is the time of the event, $t_0$ is the current time, $C_i$ is a constant used to limit the rate of decay for the data source containing the ith event, $k_i$ is an optional constant to weight occurrences in some data sources higher than others.

In some embodiments, $k_i$ may be determined based on how reliable a certain data source is. For example, if an IP address appears in the list of internal bank IP addresses, this may indicate that this IP address is more trustworthy than those IP addresses that appear in customer web sessions. Alternatively, in some other embodiments, the value of $k_i$ may be determined using an approach that is similar to the determination of the weight $c_i$ for the data source containing the ith occurrence of the IP address as discussed in FIG. 5. A weight $c_i$ for a data source can be calculated based on the percentage of IP addresses that are actually used by authorized users, trusted employees/customers, etc., as compared to the total reported IP addresses as being used by such users.

In some embodiments, in addition to the usage score calculated as above, the usage score is further normalized to constrain the score to a value between 0 and 1. Depending on the embodiment, such normalization may be achieved through a function such as:

$$\hat{S} := \left(\frac{2}{\pi}\right) \arctan(k S_{usage}),$$

where $\hat{S}$ represents a normalized usage score, $S_{usage}$ is the usage score before normalization, and k is the constant to control how quickly $\hat{S}$ approaches 1. The constant k may be configured and changed by a user or an administrator based on need.

In some embodiments, calculating a separate usage score for an IP address may be favorable over combining it with the threat reputation score. If the usage score is a separate non-zero score, it may indicate immediately to a user or administrator that an investigation may be necessary to see whether an IP address is being used in a non-malicious way before potentially black listing the IP address based on a high threat reputation score. On the other hand, it may also indicate to the administrator to see whether the account of a trusted user or employee has been hacked or rendered as a dummy for attacks.

Moreover, calculating a separate usage score allows the threat reputation score to separately indicate risks associated with an IP address, without diluting with positive customer and employee activity. Finally, calculating a separate usage score may make it easier to answer a question such as "What percentage of blacklisted IP addresses are our customers' and employees' IP addresses?" This may be achieved by generating the usage score for each blacklisted IP address and see if any of the usage scores are non-zero or significantly above zero.

Example Heat Map Interface

Figure 8:
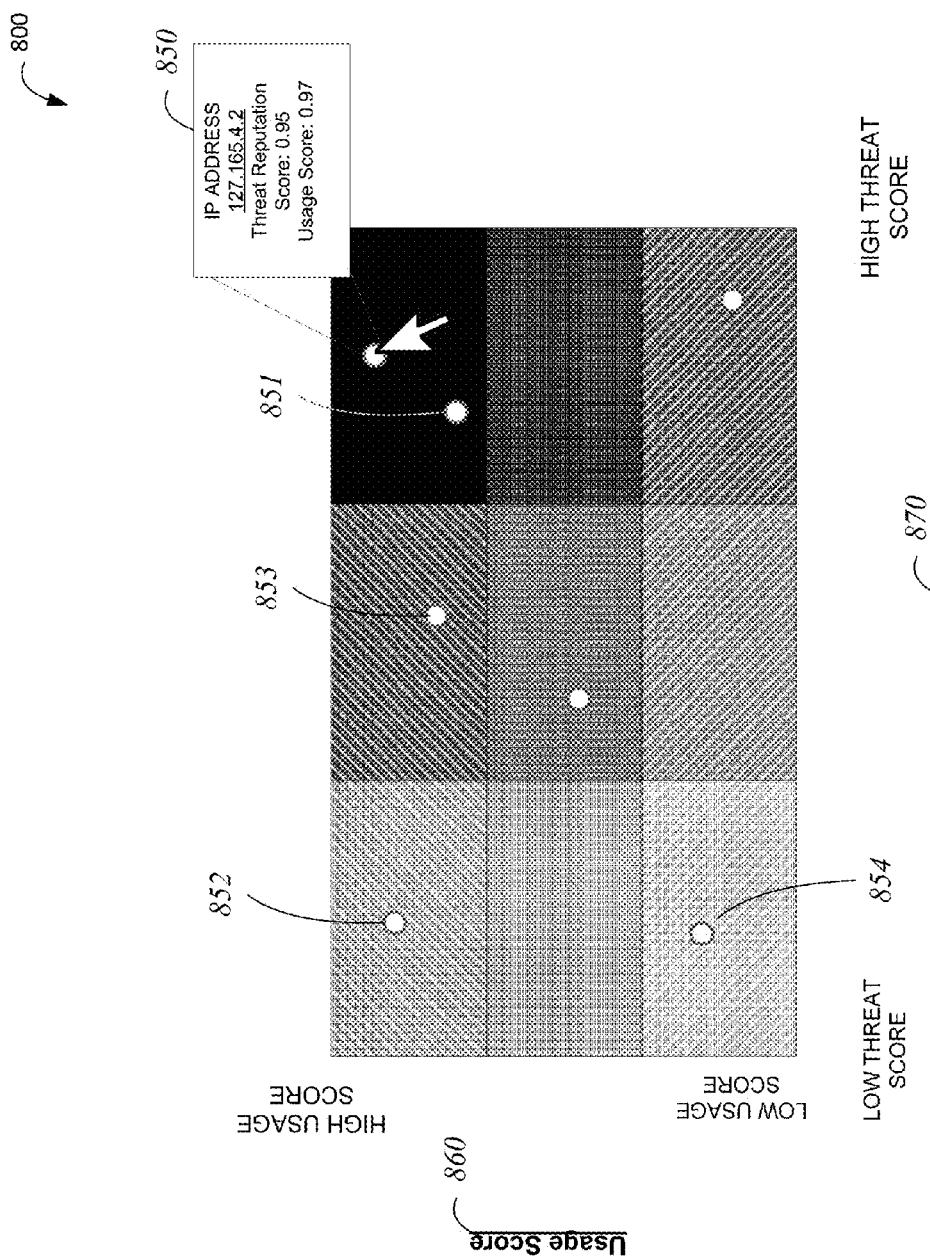
FIG. 8 is a two-dimensional heat map illustrating threat reputation scores and usage scores of IP addresses.

FIG. 8 is a two-dimensional example heat map illustrating several IP addresses within a threat reputation scores and usage scores matrix. The heat map 800 includes two dimensions, the horizontal dimension representing threat score 870 and the vertical dimension representing usage score 860. The heat map may display the scores associated with a plurality of IP addresses.

Depending on the embodiment, each IP address may be represented by the reporting module 158 in the heat map 800 using its threat reputation score and usage score. As can be seen from the heat map 800, an IP address 851 with a high threat reputation score appears on the right part of the heat map 800. An IP address 852 with a low threat reputation score appears on the left part of the heat map 800. An IP address 853 associated with a high usage score usually appears on the upper part of the heat map 800, and an IP address 854 associated with a low usage score usually appears on the lower part of the heat map 800. Plotting the scores associated with a plurality of IP addresses can also demonstrate whether the scores of a particular IP address are high or low as compared to other scores and allows a user to identify areas of potential interest. For example, in one embodiment a user may be primarily interested in IP addresses associated with a high risk score and a low usage score. Accordingly, the user may look towards the lower right-hand quadrant of the heat map in order to identify IP addresses that fall within this category. Additionally, the user may easily identify clusters of IP addresses within (or across) a particular quadrant. Such clustering may be indicative of behavior that the user desires to investigate.

In some embodiments, the heat map may be resolved into specific IP addresses. For example, an IP address and its associated scores may be displayed in pop-up window 850 when a mouse hovers on top of that point in the heat map. The IP address displayed is 127.165.4.2, and it has a threat reputation score of 0.95 and usage score of 0.97. Depending on the specific instance, the scores may mean that this is a false positive because the IP address is very trustworthy and it should not have a high threat reputation score. However, the scores could also mean that a hacker is posing as a trusted user and has been involved in actual threat events. Either way, the heat map 800 may be used for recognizing noteworthy IP addresses for further analysis and also for displaying trends of possible network threats. Although a pop-up window is shown in this example, other types of user interface elements may also be used to demonstrate details regarding the scores associated with an IP address to a user.

Implementation Mechanisms

According to one embodiment, the techniques described herein are implemented by one or more special-purpose computing devices, such as the IP reputation system 150. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
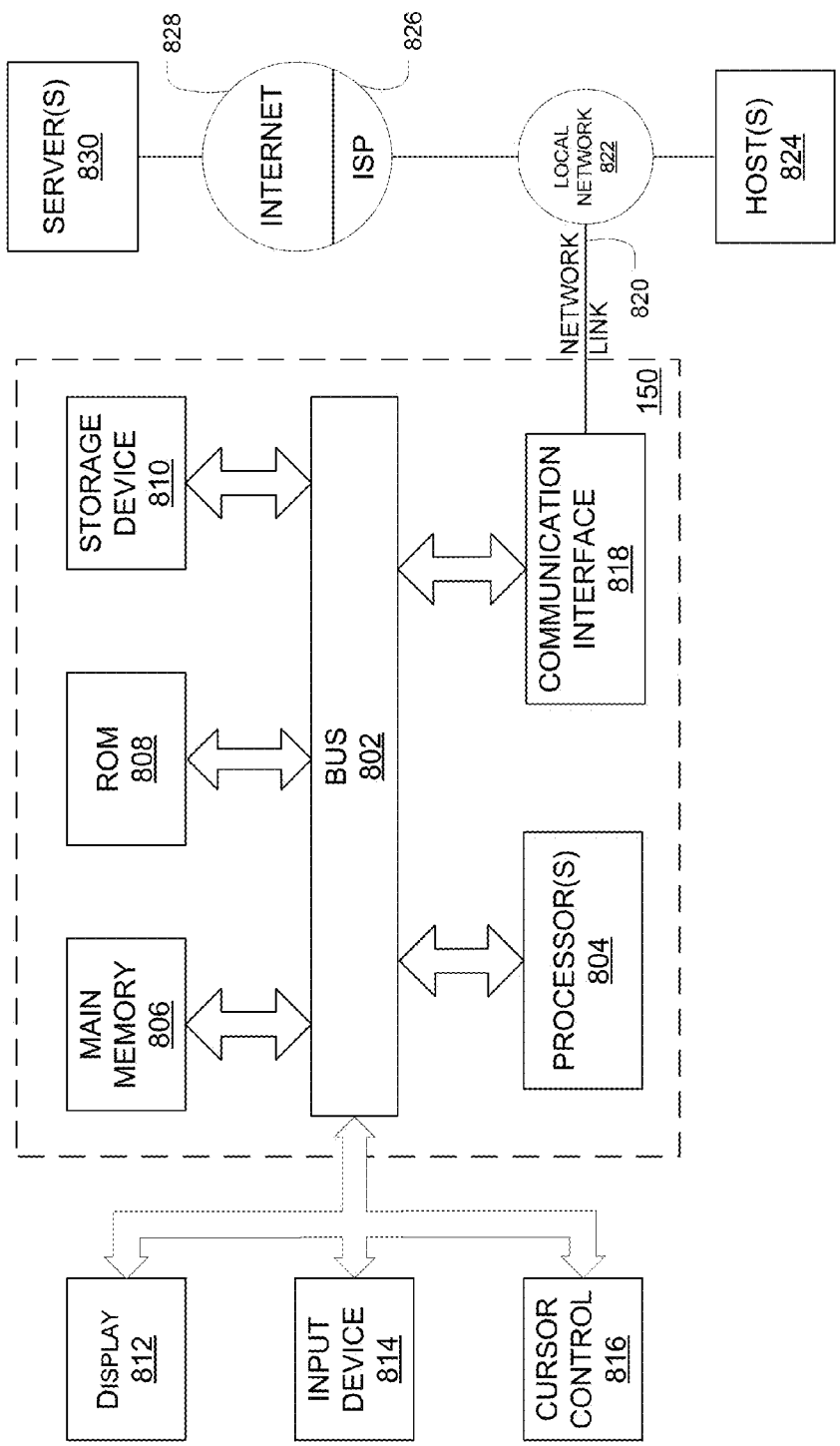
FIG. 9 is a block diagram illustrating one embodiment of a computer system with which certain methods and modules discussed herein may be implemented.

For example, FIG. 9 is a block diagram that illustrates a computer system (such as the IP reputation system 150) upon which the processes discussed herein may be implemented. For example, the risk assessment 340 and the heat map interface 800 may be generated and displayed to a user by an IP reputation system 150, while a search query may be executed by another IP reputation system 150 (or possibly the same computer system in some embodiments). Furthermore the data sources may each include any portion of the components and functionality discussed with reference to the IP reputation system 150.

The IP reputation system 150 includes a bus 802 or other communication mechanism for communicating information, and a hardware processor, or multiple processors, 804 coupled with bus 802 for processing information. Hardware processor(s) 804 may be, for example, one or more general purpose microprocessors.

The IP reputation system 150 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render IP reputation system 150 into a special-purpose machine that is customized to perform the operations specified in the instructions.

The IP reputation system 150 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The IP reputation system 150 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The IP reputation system 150 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage IP reputation system 150 may implement the techniques described herein using customized hard-wired logic, one or more ASICs or FPGAs, firmware and/or program logic which in combination with the computer system causes or programs the IP reputation system 150 to be a special-purpose machine. According to one embodiment, the techniques herein are performed by the IP reputation system 150 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the firm of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to IP reputation system 150 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

IP reputation system 150 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from the IP reputation system 150, are example forms of transmission media.

The IP reputation system 150 can send messages and receive data, including program code, through the network (s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may he deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for detecting computer network threats, the system comprising:
   one or more computer hardware processors that execute specific code instructions to cause the system to at least:
   receive a network address from a first data source, the first data source comprising a computing system connected to a network, the computing system configured to receive network traffic;
   determine a threat indicator for the network address, wherein the threat indicator indicates a risk level associated with the network address, and wherein the threat indicator is based at least in part on:
   a quantity of occurrences of the network address in the first data source,
   a cumulative time between respective occurrences of the network address in the first data source and a first time, and a likelihood that a perceived threat of the network address is an actual threat, wherein the likelihood is based at least in part on historical data of past threat events from the first data source; and provide the threat indicator to an entity device, wherein the entity device is configured to block the network address based at least in part on the threat indicator.

2. The system of claim 1, wherein the first data source further comprises at least one of: an internal blacklist, an external blacklist, a firewall, or an intrusion detection system.

3. The system of claim 1, wherein the threat indicator comprises a threat score.

4. The system of claim 1, wherein the one or more computer hardware processors execute the specific code instructions to further cause the system to at least:

determine an updated threat indicator that indicates a higher risk level relative to the threat indicator, wherein the updated threat indicator is based at least in part on one of: a greater quantity of occurrences of the network address in the first data source, a change in the cumulative time, or a greater likelihood of the actual threat.

5. The system of claim 1, wherein the one or more computer hardware processors execute the specific code instructions to further cause the system to at least:

receive the network address from a second data source, wherein receiving the network address from the second data source indicates that the network address was likely involved in a network attack, and wherein respective data source types for the first and second data sources are different; and in response to receiving the network address from the first data source and the second data source, increasing the likelihood that the perceived threat of the network address is an actual threat.

6. A computer-implemented method comprising:

receiving a network address from a first data source and a second data source, the first data source comprising a computing system connected to a network, wherein the second data source is different from the first data source;

determining a usage indicator for the network address, wherein the usage indicator indicates a trust level associated with the network address, and wherein the usage indicator is based at least in part on:

a quantity of occurrences of the network address in at least one of the first data source or the second data source, a difference in time between at least one occurrence of the network address in at least one of the first data source or the second data source and at least a first time, wherein a smaller difference in time indicates a higher trust level, and a likelihood that the network address is trustworthy, wherein the likelihood is based at least in part on historical data of activities associated with at least one of the first data source or the second data source; and providing the usage indicator to an entity device, wherein the entity device is configured to allow the network address based at least in part on the usage indicator.

7. The computer-implemented method of claim 6, wherein the first data source is associated with at least one of: a Virtual Private Network, a firewall, a proxy server, a whitelist, or a trusted user list.

8. The computer-implemented method of claim 6, further comprising:

determining that the network address is associated with at least one of: a trusted user list, a whitelist, employee data, or a Virtual Private Network list; and in response to determining the network address's association, increasing the likelihood that the network address is trustworthy.

9. The computer-implemented method of claim 8, wherein the network address's association is based at least in part on the network address's membership in at least one of the: trusted user list, whitelist, employee data, or Virtual Private Network list.

10. The computer-implemented method of claim 6, further comprising:

causing presentation of the usage indicator and the network address in a user interface.

11. The computer-implemented method of claim 6, wherein the usage indicator comprises a usage score.

12. The computer-implemented method of claim 11, wherein determining the usage indicator for the network address further comprises increasing the usage score where there is a greater quantity of occurrences of the network address in a plurality of data sources, and wherein the increased usage score indicates a higher trust level associated with the network address.

13. A computer-implemented method comprising:

receiving a network address from a first data source, the first data source comprising a computing system connected to a network, the computing system configured to receive network traffic;

determining a threat indicator for the network address, wherein the threat indicator indicates a risk level associated with the network address, and wherein the threat indicator is based at least in part on:

a quantity of occurrences of the network address in the first data source, a cumulative time between respective occurrences of the network address in the first data source and a first time, and a likelihood that a perceived threat of the network address is an actual threat, wherein the likelihood is based at least in part on historical data of past threat events from the first data source; and providing the threat indicator to an entity device, wherein the entity device is configured to block the network address based at least in part on the threat indicator.

14. The computer-implemented method of claim 13, wherein the threat indicator comprises a threat score.

15. The computer-implemented method of claim 14, further comprising:

determining a recency of each occurrence of the network address in the first data source from a second time between respective occurrences and the first time, wherein determining the threat indicator for the network address further comprises increasing the threat score where the recency of each occurrence indicates more recent suspicious activity.

16. The computer-implemented method of claim 14, wherein determining the threat indicator for the network address further comprises increasing the threat score where there is a greater quantity of occurrences of the network address in the first data source, and wherein the increased threat score indicates a higher risk level associated with the network address.

17. The computer-implemented method of claim 14, wherein determining the threat indicator for the network address further comprises increasing the threat score where there is a greater quantity of occurrences of the network address in a plurality of data sources, and wherein the increased threat score indicates a higher risk level associated with the network address.

18. The computer-implemented method of claim 13, further comprising:
   receiving the network address from a second data source, wherein receiving the network address from the second data source indicates that the network address was likely involved in a network attack; and
   in response to receiving the network address from the first data source and the second data source, increasing the likelihood that the perceived threat of the network address is an actual threat.

19. The computer-implemented method of claim 13, further comprising:
   causing presentation of the threat indicator and the network address in a user interface.

20. The computer-implemented method of claim 13, wherein the first data source further comprises at least one of: an internal blacklist, an external blacklist, a firewall, or an intrusion detection system.

* * * * *